Patented Nov. 15, 1927.

1,649,127

UNITED STATES PATENT OFFICE.

THOMAS M. RECTOR, OF NEW YORK, N. Y., ASSIGNOR TO VITAPACK CORPORATION, OF HOBOKEN, NEW JERSEY, A CORPORATION OF NEW YORK.

CANNING PROCESS.

No Drawing.   Application filed April 28, 1922.   Serial No. 557,180.

The present invention relates to an improvement in the art of preserving food or other products against the effects of oxygen, and against other deleterious influences, by sealing the products in a container without oxygen and with a substituted gas, such as carbon dioxide. The advantages of so-called "gas canning" are well-known, but the application of the process has been somewhat limited, particularly as regards liquid or pasty foods, such as edible oils, condensed milk, &c., as well as products which are partly solid but surrounded by liquid, as for instance, fruits and vegetables put in syrup, brine, or other liquid.

Oxygen dissolved and occluded in the product or in the accompanying liquid, or contained in the space between the top of the container and the surface of the contents, is possibly the principal source of trouble, causing "pinholing," blackening of the product, rusting of the interior of the can, loss of flavor, etc.

I propose to effectively displace the oxygen content by procedure substantially as follows:

Where the product under treatment is a syrup, brine, liquid or paste, I may place it in a primary container, and remove all air from this container and its contents by heating, with or without agitation, by creating a vacuum, by displacing the air with other gases, or by combinations of these methods. Thereafter the product, thus free from air or oxygen, is charged with an inert gas, such as carbon dioxide, or nitrogen, to a predetermined amount and or pressure, depending upon the empirically predetermined temperature of the product in the primary container.

If the final product consists of both solids and liquids, the solid portion, which may or may not have been freed from injurious internal gases by displacing them with liquids or other gases, is filled into a can or other final container, and the liquid portion, which has been charged as set forth in the next preceding paragraph, is introduced into the can by any acceptable means.

Of course, if the final product is entirely in a liquid or pasty condition it may be filled into the final container directly.

For the best results certain factors will have to be controlled. Thus, the substituted gas will be chosen with its solubility in particular liquids, in mind. And the temperature of the product, and the gas pressure to which the liquid is submitted, must be regulated with a view to particular amounts or pressures of dissolved gas desired in the charged liquid or product.

The oxygen-free, gas-charged product, in its final can or container, is now to be sealed up, and there is to be sufficient flow of gas from the product just before sealing so that air or oxygen is effectively swept out of the can during the interval between the filling of the container with the charged liquid, and the final sealing of the container.

If the gas in the charged product is under a greater than atmospheric pressure, it will begin to escape as soon as the product is discharged into the can.

In some cases I may prefer to saturate a cooled product with the substitute gas at atmospheric pressure, and then heat the can before the final sealing, whereby sufficient gas is liberated to sweep out adventitious oxygen or air. In any case the can should be partially closed while the escaping gas is driving out air, or oxygen. This may be done by partially crimping on the top, and completing the crimping to hermetically seal the can when the scavenging is complete. Or, a cover might be finally crimped on, and provided with a small hole through which gas can escape, this hole to be tipped with solder when scavenging is complete. By either method the can is protected against loss of substitute gas because of drafts, etc. Obviously, there are distinct relations between gas pressure, size of escape opening or openings, and time interval between the moment when the can is filled and the completion of the hermetic seal. The escaping gas scavenges the can, and prevents the entrance of outside air or oxygen, and that which does not escape provides a beneficial, or at least harmless atmosphere within the can.

If desired, the charging pressure and the time interval for the scavenging operation may be so regulated that there will be a slight gas pressure in the sealed can.

This description is to be taken as illustrative merely, and I intend no limitation to particular materials, steps of process, or sequential relation of steps, except as may be demanded by the claims.

I claim:

1. The method of preserving a liquid product against the effect of deleterious gas which comprises first, replacing the deleterious-gas-contents of the product in bulk, in a primary container, with an innocuous gas, then placing the product in a number of relatively small final containers, with the contained gas at a pressure not substantially greater than atmospheric, causing flow of the innocuous gas from the product in the final containers whereby deleterious gases are swept out and entry thereof into the final containers is prevented, and sealing the final containers while the gas flow therefrom continues and with the contained gas at a pressure not substantially greater than atmospheric.

2. The method of preserving a product that is a mixture of solids and liquids, which consists in treating the liquid constituents separately from the solids and replacing the deleterious-gas-contents of said liquid constituents in bulk in a primary container with an innocuous gas, then placing the charged liquid constituents and solid constituents in a number of relatively small final containers with the contained gas at a pressure not substantially greater than atmospheric, causing flow of the innocuous gas from the liquid constituents in the final containers whereby deleterious gases are swept out and entry thereof into the containers is prevented, and sealing the final containers while the gas flow continues and with the contained gas at a pressure not substantially greater than atmospheric.

In testimony whereof I affix my signature.

THOMAS M. RECTOR.